Dec. 26, 1933.    C. SMITH    1,941,023
COMBINATION RELIEF VALVE
Filed May 11, 1931    2 Sheets-Sheet 1
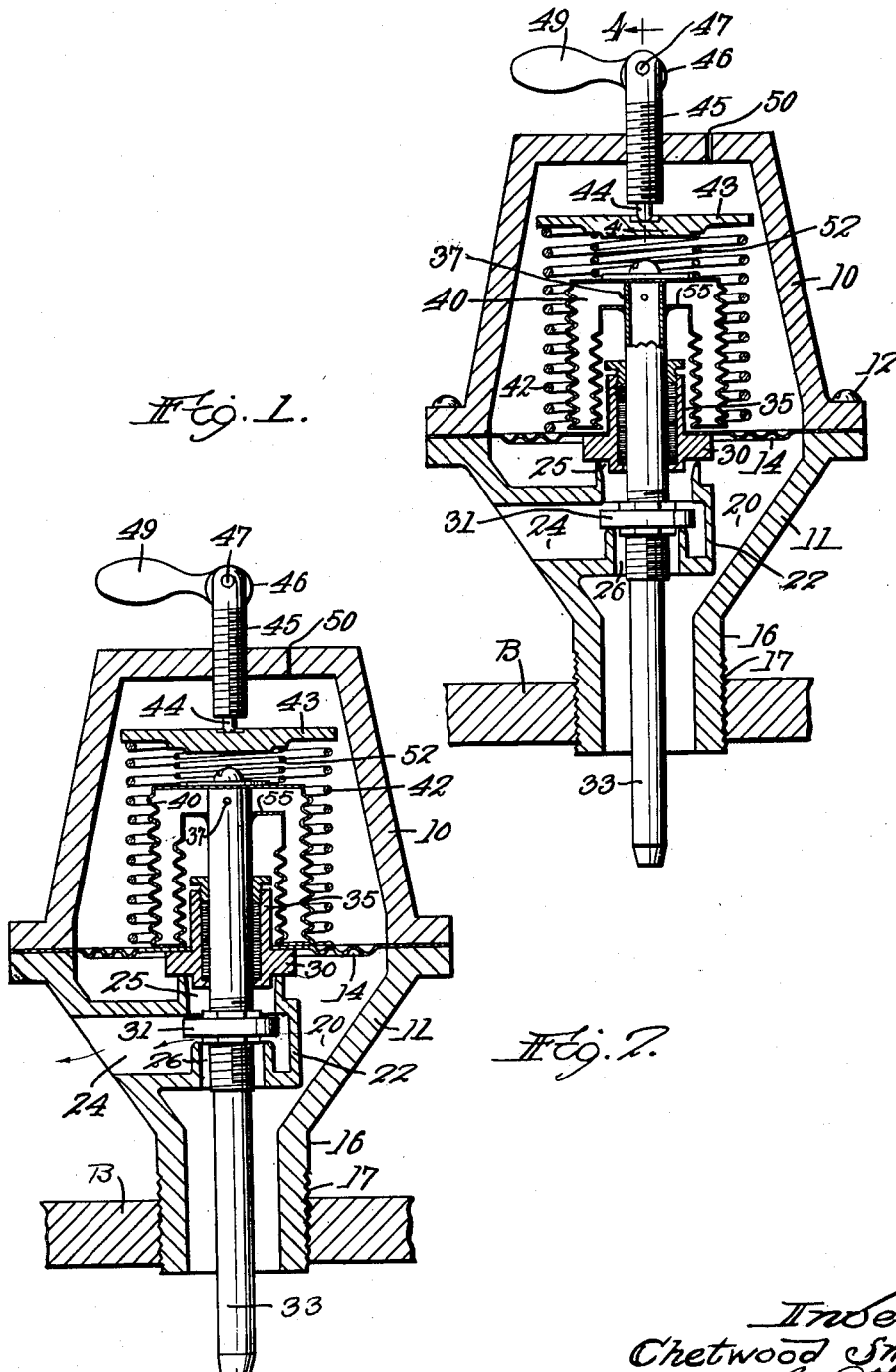
Inventor
Chetwood Smith
By Attorneys Dec. 26, 1933.   C. SMITH   1,941,023
COMBINATION RELIEF VALVE
Filed May 11, 1931   2 Sheets-Sheet 2
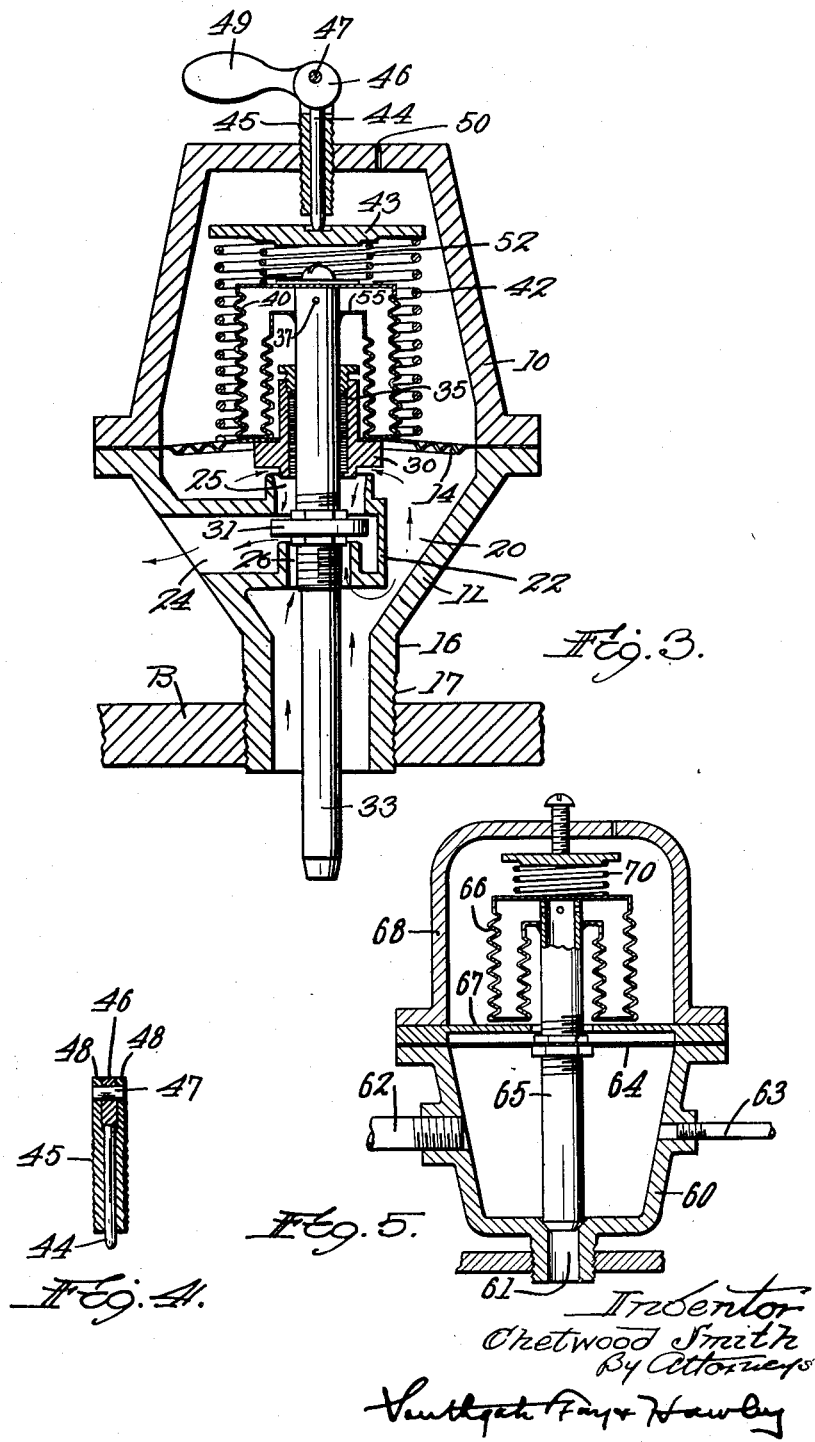

Patented Dec. 26, 1933

1,941,023

UNITED STATES PATENT OFFICE 1,941,023

COMBINATION RELIEF VALVE

Chetwood Smith, Worcester, Mass.

Application May 11, 1931. Serial No. 536,395

8 Claims. (Cl. 137—139)

This invention relates to a combination relief valve adapted to open and allow liquid to escape from a protected system upon the occurrence of excessive pressure or excessive temperature in the system.

It is an important object of my invention to provide a combination pressure and temperature responsive relief valve in which the operating parts are fully protected from dirt and corrosion and also from the action of the liquid in the protected system.

A further object is to provide a construction in which the temperature responsive relief valve is movable independently of the pressure relief valve for a rise in temperature, but movable in unison with the pressure relief for an excessive rise in pressure, thus providing increased pressure relief area.

My invention further relates to arrangements and combinations of parts which will be hereinafter described and more particularly pointed out in the appended claims.

A preferred form of the invention is shown in the drawings, in which

Fig. 1 is a sectional side elevation of my improved combination valve;

Fig. 2 is a view similar to Fig. 1 but showing the valve open, responsive to excessive temperature;

Fig. 3 is a view similar to Fig. 1 but showing the valve open to relieve excessive pressure;

Fig. 4 is a detail sectional elevation, taken along the line 4—4 in Fig. 1, and

Fig. 5 is a sectional elevation of a modified construction.

Referring to the drawings, my improved combination relief valve comprises a two-part casing formed of an upper casing member 10 and a lower casing member 11, secured together by clamping screws 12. A diaphragm 14 forms a partition across the middle of the casing and is clamped between the adjacent portions of the casing members 10 and 11. A pressure chamber 20 is thus formed within the lower casing member 11.

The lower casing member 11 is provided with a depending attaching portion 16, threaded at 17 for insertion in the shell of a boiler B or other container, or in a pipe fitting. A member 22 projects into the pressure chamber 20 from one side of the casing member 11 and is provided with a relief passage 24, and with upstanding annular flanges forming ports 25 and 26 for a pressure relief valve 30 and a temperature relief valve 31.

The pressure relief valve 30 is secured to the under side of the diaphragm 14 previously described and will be lifted from its seat by excessive pressure in the chamber 20, acting against the under side of the diaphragm 14.

The temperature responsive relief valve 31 is mounted on a tube 33, which extends upward through a packing member 35 supported by the pressure relief valve 30 and aligned with the axis thereof.

The tube 33 projects upward beyond the packing member 35 and is secured at its upper end to the top of an inverted double expansion member 40, preferably made in the form of a metal bellows structure having inner and outer corrugated walls. Ports 37 connect the interior of the tube 33 with the interior of the expansion member 40, and both the tube 33 and member 40 are completely filled with a heat expansive fluid which is sealed therein. The bottom of the expansion member 40 is spaced slightly from the upper side of the diaphragm 14.

The pressure relief valve 30 and diaphragm 14 are pressed downward by a relatively heavy coil spring 42, the upper end of which engages a disc 43, which in turn is engaged by the lower end of a stud 44, slidable in a tension adjusting screw 45 threaded in the upper end of the casing member 10.

An eccentric member 46 is pivoted at 47 in lugs or projections 48 at the upper end of the screw 45. The eccentric member is positioned to engage the upper end of the stud 44 and is provided with a handle 49 by which it may be manipulated. The handle 49 may conveniently be used to turn the screw 45 for adjusting the position of the disc 43.

The handle 49 is shown in normal position in Fig. 1, with the larger portion of the eccentric 46 engaging the stud 44 and pressing it downward against the disc 43. When the handle 49 is moved to upright position, the plunger 44 is released, relieving the spring pressure on the diaphragm 14 and allowing the pressure relief valve 30 to open for testing or inspection.

A vent 50 may be provided in the upper casing member 10 to prevent the building up of pressure in the upper casing member in the event of leakage through the packing member 35.

A relatively light spring 52 is interposed between the middle portion of the disc 43 and the top of the expansion member 40. The inner top portion 55 of the double expansion member 40 may be soldered or otherwise firmly secured to the tube 33 so as to prevent leakage from the interior of the expansion member.

Having described the construction of my improved combination valve, the operation thereof is as follows:

Assuming that the casing member 11 is threaded into the top of a boiler B or other device to be protected, the adjusting screw 45 will be turned inward until the spring 42 has been compressed to give the desired resistance to the diaphragm 14 and to the pressure relief valve 30.

So long as the pressure within the chamber 20 does not exceed the predetermined pressure, the valve 30 remains seated.

The temperature responsive relief valve 31 is preferably threaded on the tube 33 so that the distance between the face of the valve 31 and the top of the expansion member 40 may be varied, increasing or decreasing the clearance between the bottom of the member 40 and the diaphragm 14. The valve 31 may be thus adjusted to remain seated until a predetermined temperature in the chamber 20 is reached or exceeded.

As the temperature of the water or other fluid in the boiler B and pressure chamber 20 increases, the temperature of the fluid in the tube 33 also increases and this increase in temperature causes the fluid to expand into the upper end of the expansion member 40, causing the expansion member 40 to expand lengthwise.

When the expansion member 40 has expanded downward until it is firmly seated against the diaphragm 14 and pressure relief valve 30, it must thereafter expand against the spring 52, carrying with it the tube 33 and thereby raising the temperature responsive relief valve 31 from its port 26, which allows fluid to escape through the discharge passage 24 so long as the excessive temperature condition continues.

During such operation of the temperature responsive relief valve 31, the pressure relief valve 30 remains firmly seated and closed. When the temperature falls, the expansion member 40 contracts lengthwise and the temperature relief valve 31 is closed by the pressure of the spring 52.

If the pressure instead of the temperature of the liquid in the chamber 20 rises above a predetermined point, the diaphragm 14 is forced upward, carrying with it the pressure relief valve 30 and allowing fluid to flow through the pressure relief port 25 to the discharge passage 24. If the pressure increases sufficiently, the upward movement of the diaphragm 14 causes it to engage and lift the expansion member 40 bodily, carrying with it the tube 33 and the temperature responsive relief valve 31, thus opening the temperature responsive relief valve 31 in addition to the pressure relief valve 30.

Consequently on an excessive increase in pressure, both relief valves 30 and 31 are opened, thereby providing increased pressure relief area.

From the foregoing description, it will appear that the temperature responsive relief valve 31 operates singly and independently, while the pressure and temperature responsive relief valves 30 and 31 operate together in the event of excessive rise in pressure. This has the advantage that the temperature responsive relief valve is opened and flushed every time the pressure relief valve is opened by excessive pressure.

An important advantage of my improved combination relief valve lies in the fact that the expansion member for the temperature responsive relief valve is mounted entirely above the diaphragm 14 and out of contact with the liquid in the protected system. Consequently these parts are not exposed to corrosion or to accumulation of dirt or silt, as would be the case if they were mounted in the pressure chamber 20.

The eccentric 46 and handle 49 afford quick-acting and convenient means for relieving the pressure relief valve 30, so that the valve 30 may be opened by relatively low pressure in the chamber 20. When the valve 30 opens, the valve 31 is also opened, as above described, whereupon both valves will be cleaned and flushed.

In Fig. 5 I have shown a modified construction designed for operation by an increase in temperature only. In this construction, a casing 60 is provided with an inlet 61 and outlet 62 and with a passage 63 connected to a chamber or mechanism to be controlled. A diaphragm 64 closes the upper side of the casing 60 and supports a hollow tube or plunger 65, the lower end of which acts as a valve for the inlet passage 61.

At its upper end the tube 65 is connected with the interior of a double expansion member 66, similar to the expansion member 40 previously described. The lower end of the expansion member 66 is spaced slightly above a fixed annular abutment 67 which may be secured between the inside of a cap or cover 68 and the casing 60. A spring 70 normally seats the lower end of the tube 65 against the inner end of the inlet passage 61.

The liquid in the casing 60 is practically without circulation when the inlet passage 61 is closed, but varies in temperature with the temperature of the controlled mechanism, by reason of the connecting passage 63. If the temperature of the fluid in the casing 60 rises above a predetermined point, the fluid in the tube 65 expands, causing the lower end of the expansion member 66 to engage the annular abutment 67 and thereafter lifting the tube 65 so as to open the passage 61 and to allow cold water or other liquid to flow through the casing 60 to the outlet 62, which is connected in any desired manner to the mechanism to be controlled. It is thus possible to control the temperature of apparatus in which acids or chemicals are used which would quickly destroy an expansion member placed directly therein. In my construction, the tube 65 only is exposed to the heated liquid and this tube may be made of stainless steel or other metal alloy well adapted to resist the action of chemicals or gases but not suitable for the construction of expansion members. The member 66, being entirely separated from the heated liquid to be controlled, may be made of any suitable metal and will not be exposed to corrosion by the action of the liquid.

Having thus described my invention and the advantages thereof, I do not wish to be limited to the details herein disclosed, otherwise than as set forth in the claims, but what I claim is:—

1. A combination relief valve comprising a casing, a diaphragm mounted in said casing and forming one side of a pressure chamber, a member projecting into said pressure chamber and having two separate valve ports, a pressure relief valve mounted on said diaphragm and normally closing one valve port, a temperature responsive relief valve mounted in said chamber and normally closing the second valve port, means to yieldingly seat said temperature responsive valve, and means to open said temperature responsive valve upon an increase in temperature of the fluid in said pressure chamber above a predetermined point, while said pressure relief valve remains closed.

2. A combination relief valve comprising a casing, a diaphragm mounted in said casing and forming one side of a pressure chamber, a member projecting into said pressure chamber and having two separate valve ports, a pressure relief valve mounted on said diaphragm and normally closing one valve port, a temperature responsive relief valve mounted in said chamber and normally closing the second valve port, means to yieldingly seat said valves, means to open said temperature responsive valve upon an increase in temperature of the fluid in said pressure chamber above a predetermined point while said pressure relief valve remains closed, and means to open said temperature responsive relief valve with said pressure relief valve upon the occurrence of excessive pressure in said pressure chamber.

3. A combination relief valve comprising a casing, a diaphragm mounted in said casing and forming one side of a pressure chamber, a member projecting into said pressure chamber and having two separate valve ports, a pressure relief valve mounted on said diaphragm and normally closing one valve port, a temperature responsive relief valve mounted in said chamber and normally closing the second valve port, means to yieldingly seat said valves, and means to open said temperature responsive valve upon an increase in temperature of the fluid in said pressure chamber above a predetermined point while said pressure relief valve remains closed, said means comprising an expansion member mounted outside of said pressure chamber, and connections from said expansion member to said temperature responsive relief valve.

4. A combination relief valve comprising a casing, a diaphragm mounted in said casing and forming one side of a pressure chamber, a member projecting into said pressure chamber and having two separate valve ports, a pressure relief valve mounted on said diaphragm and normally closing one valve port, a temperature responsive relief valve mounted in said chamber and normally closing the second valve port, means to yieldingly seat said valves, and means to open said temperature responsive valve upon an increase in temperature of the fluid in said pressure chamber above a predetermined point while said pressure relief valve remains closed, said means comprising an expansion member mounted outside of said pressure chamber, and a tube connected to said expansion member and extending into said chamber and having said temperature responsive relief valve mounted thereon, said tube and expansion member containing a heat-expansive fluid.

5. The combination of a temperature responsive and pressure relief valve as set forth in claim 4, in which said diaphragm acts to open said pressure relief valve upon a rise in pressure in said pressure chamber, and in which said diaphragm is connected to open said temperature responsive relief valve on a further rise in pressure.

6. The combination of a temperature responsive and pressure relief valve as set forth in claim 4, in which said diaphragm acts to open said pressure relief valve upon a rise in pressure in said pressure chamber, in which said diaphragm is connected to open said temperature responsive relief valve on a further rise in pressure, and in which a tube containing a heat-expansive fluid is interposed in the connections between the diaphragm and the temperature responsive relief valve.

7. A combination relief valve having separate temperature-responsive and pressure relief valves and separate concentrically arranged relief ports for said valves, said temperature-responsive valve having a valve rod passing through the pressure relief valve and its valve port.

8. A combination relief valve having a pressure chamber, separate temperature-responsive and pressure relief valves and separate relief ports for said valves in said chamber, said pressure relief valve being mounted in said chamber and opening inward with an increase in pressure, and said temperature-responsive relief valve being mounted outside of said chamber and opening outward on an increase in temperature.

CHETWOOD SMITH.